US012705443B2

(12) United States Patent
Yaginuma

(10) Patent No.: US 12,705,443 B2
(45) Date of Patent: Aug. 11, 2026

(54) WIRELESS TAG COMMUNICATION DEVICE AND WIRELESS TAG COMMUNICATION METHOD

(71) Applicant: TOSHIBA TEC KABUSHIKI KAISHA, Tokyo (JP)

(72) Inventor: Jun Yaginuma, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 18/666,860

(22) Filed: May 17, 2024

(65) Prior Publication Data

US 2025/0148228 A1 May 8, 2025

(30) Foreign Application Priority Data

Nov. 8, 2023 (JP) ................................ 2023-190982

(51) Int. Cl.
*G06K 7/10* (2006.01)

(52) U.S. Cl.
CPC ..... *G06K 7/10297* (2013.01); *G06K 7/10316* (2013.01); *G06K 7/10475* (2013.01)

(58) Field of Classification Search
CPC ...... G08B 13/24; G08B 29/18; G08B 29/185; G06K 7/10; G06K 7/10297; G06K 17/00; G06K 19/07
See application file for complete search history.

(56) References Cited

U.S. PATENT DOCUMENTS 10,303,905 B2 * 5/2019 Lombardi .......... G06K 7/10019
2021/0082277 A1 * 3/2021 Riggert ................ G08B 13/246
2021/0390222 A1 12/2021 Wodrich et al.
2024/0193670 A1 * 6/2024 Kitamura ............... G06Q 10/08

FOREIGN PATENT DOCUMENTS

JP 2011-237941 11/2011
JP 2016-109487 6/2016

OTHER PUBLICATIONS

Japanese Office Action for Japanese Patent Application No. 2023-190982 mailed Jun. 2, 2026.

* cited by examiner

*Primary Examiner* — Van T Trieu
(74) *Attorney, Agent, or Firm* — Amin, Turocy & Watson, LLP

(57) ABSTRACT

Provided is a wireless tag communication device and a wireless tag communication method capable of specifying a location where an RFID tag exists. According to one embodiment, a wireless tag communication device includes a communication device, a position detection sensor, a memory, and a processor. The communication device communicates with a wireless tag that is a target. The position detection sensor detects information indicating a self position of the wireless tag communication device. The memory stores the self position, which is specified based on detection information from the position detection sensor, in association with a reading result obtained by reading the wireless tag by the communication device. The processor estimates a position of the wireless tag when three or more consecutive reading results of the wireless tag at a predetermined interval are obtained, the three or more consecutive reading results of the wireless tag being stored in the memory.

20 Claims, 10 Drawing Sheets

19
HOST DEVICE (SERVER OR THE LIKE)
1
25
COMMUNICATION I/F
21
PROCESSOR
23
WIRELESS TAG COMMUNICATION UNIT
22
MEMORY
13
14
DISPLAY
15
INPUT DEVICE
24
SENSOR
26
CAMERA
WIRELESS TAG COMMUNICATION DEVICE

| ANGLE [deg] | ANGLE [rad] | X | Y | DISTANCE [m] | DIFFERENCE DISTANCE [m] | Li/Lr |
|---|---|---|---|---|---|---|
| 0 | 0 | 0.000 | 7.500 | 7.500 | 0.500 | 1 |
| 10 | 0.174533 | 0.087 | 7.508 | 7.508 | 0.492 | 0.983804 |
| 20 | 0.349066 | 0.171 | 7.530 | 7.532 | 0.468 | 0.935809 |
| 30 | 0.523599 | 0.250 | 7.567 | 7.571 | 0.429 | 0.857768 |
| 40 | 0.698132 | 0.321 | 7.617 | 7.624 | 0.376 | 0.752489 |
| 50 | 0.872665 | 0.383 | 7.679 | 7.688 | 0.312 | 0.623694 |
| 60 | 1.047198 | 0.433 | 7.750 | 7.762 | 0.238 | 0.475825 |
| 70 | 1.22173 | 0.470 | 7.829 | 7.843 | 0.157 | 0.313848 |
| 80 | 1.396263 | 0.492 | 7.913 | 7.928 | 0.072 | 0.143038 |
| 90 | 1.570796 | 0.500 | 8.000 | 8.016 | −0.016 | −0.03122 |
| 100 | 1.745329 | 0.492 | 8.087 | 8.102 | −0.102 | −0.2036 |
| 110 | 1.919862 | 0.470 | 8.171 | 8.185 | −0.185 | −0.36901 |
| 120 | 2.094395 | 0.433 | 8.250 | 8.261 | −0.261 | −0.52271 |
| 130 | 2.268928 | 0.383 | 8.321 | 8.330 | −0.330 | −0.66041 |
| 140 | 2.443461 | 0.321 | 8.383 | 8.389 | −0.389 | −0.77836 |
| 150 | 2.617994 | 0.250 | 8.433 | 8.437 | −0.437 | −0.87344 |
| 160 | 2.792527 | 0.171 | 8.470 | 8.472 | −0.472 | −0.94315 |
| 170 | 2.96706 | 0.087 | 8.492 | 8.493 | −0.493 | −0.9857 |
| 180 | 3.141593 | 0.000 | 8.500 | 8.500 | −0.500 | −1 |

WIRELESS TAG COMMUNICATION DEVICE AND WIRELESS TAG COMMUNICATION METHOD

CROSS-REFERENCE TO RELATED APPLICATION

This application is based upon and claims the benefit of priority from Japanese Patent Application No. 2023-190982, filed on Nov. 8, 2023, the entire contents of which are incorporated herein by reference.

FIELD

Embodiments described herein relate generally to a wireless tag communication device and a wireless tag communication method.

BACKGROUND

In the related art, there is a wireless tag communication device for finding an RFID tag (hereinafter also referred to as a wireless tag) located at an unspecified position. The wireless tag communication device communicates with the RFID tag while a position and an orientation of an antenna thereof are changed by an operation of an operator. The wireless tag communication device in the related art estimates a direction in which an RFID tag to be searched exists based on a communication state with the RFID tag to be searched.

The wireless tag communication device in the related art displays, on a display, a guidance screen including an estimation result of the direction in which the RFID tag exists, thereby reporting the direction in which the RFID tag exists to the operator. The operator searches for the RFID tag or an article to which the RFID tag is attached while moving in the direction displayed on the display. However, the wireless tag communication device in the related art reports the direction in which the RFID tag exists, and does not report a position of the RFID tag to be searched.

DESCRIPTION OF THE DRAWINGS

FIG. 3 is a block diagram schematically illustrating a second configuration example of the control system;

FIG. 4 is a diagram illustrating an example of a positional relationship when the wireless tag communication device according to the embodiment reads, at three different positions, an RFID tag to be searched;

FIG. 5 is a diagram illustrating an example of a determination table stored in a memory of the wireless tag communication device according to the embodiment;

FIG. 11 is a flowchart illustrating an operation example of a second tag search performed by the wireless tag communication device according to the embodiment; and FIG. 12 is a flowchart illustrating an operation example of a third tag search performed by the wireless tag communication device according to the embodiment.

DETAILED DESCRIPTION

Regarding the wireless tag communication device in the related art, there is a problem that it takes time for an operator who is unfamiliar with the operation to find the RFID tag. In order to solve the above problems, according to one embodiment, a wireless tag communication device and a wireless tag communication method capable of specifying a location where an RFID tag exists are provided.

According to one embodiment, a wireless tag communication device includes a communication device, a position detection sensor, a memory, and a processor. The communication device communicates with a wireless tag that is a target. The position detection sensor detects information indicating a self position of the wireless tag communication device. The memory stores the self position, which is specified based on detection information from the position detection sensor, in association with a reading result obtained by reading the wireless tag by the communication device. The processor estimates a position of the wireless tag when three or more consecutive reading results of the wireless tag at a predetermined interval are obtained, the three or more consecutive reading results of the wireless tag being stored in the memory.

Hereinafter, an embodiment will be described with reference to the drawings.

First, a configuration of a wireless tag communication device (wireless tag reading device) 1 according to the embodiment will be described.

Figure 1:
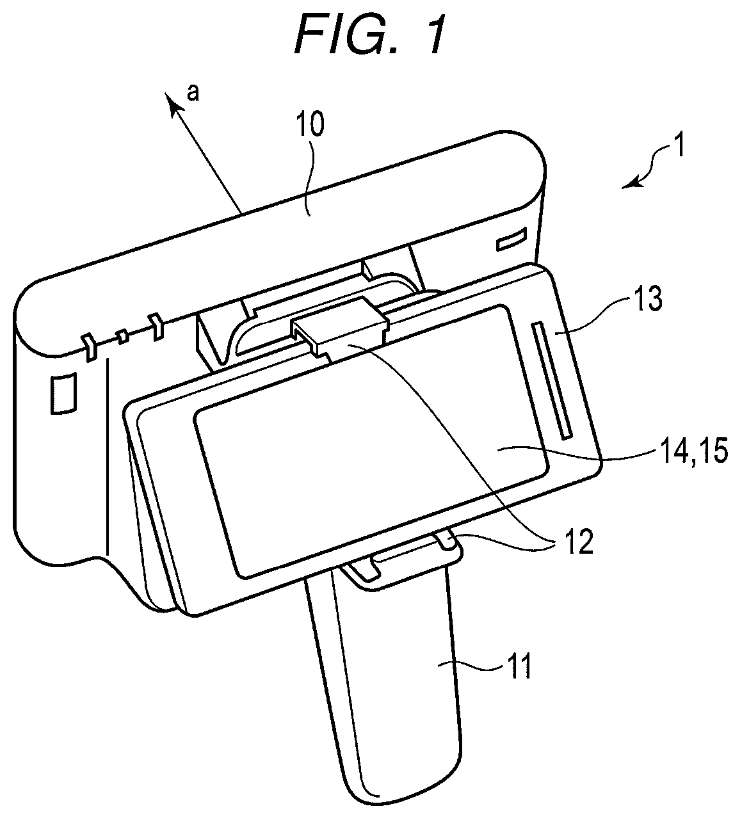
FIG. 1 is an external view illustrating a configuration example of an external appearance of a wireless tag communication device according to an embodiment.

FIG. 1 is a diagram illustrating a configuration example of an external appearance of the wireless tag communication device 1 according to the embodiment.

The wireless tag communication device 1 illustrated in FIG. 1 is a handy-type device that is operated by an operator while being held. The wireless tag communication device 1 illustrated in FIG. 1 is operated as a search device for searching for an RFID tag or an article to which an RFID tag is attached, for example.

The wireless tag communication device 1 according to the embodiment communicates with an RFID tag (a wireless tag). The wireless tag communication device 1 is a wireless tag reading device that reads tag information and the like recorded in the RFID tag by communicating with the RFID tag. The wireless tag communication device 1 estimates a position where the RFID tag exists based on a reading result of the RFID tag. The wireless tag communication device 1 displays, on a display, a guidance screen indicating information on the estimated position where the RFID tag exists.

The RFID tag is a wireless communication device that operates in response to a radio wave (an output signal) from the wireless tag communication device 1. The RFID tag includes a processor, a memory, a communication circuit, an antenna, and the like. The RFID tag outputs a response signal including tag information recorded in one's own memory in response to a read command from the wireless tag communication device 1. For example, the RFID tag is attached to an article such as a commodity or a part. In an RFID tag attached to an article, tag information including information specifying the article is recorded in an internal memory thereof.

The wireless tag communication device 1 according to the embodiment is operated by an operator. The wireless tag communication device 1 is a device that communicates with a designated RFID tag while being moved. For example, the wireless tag communication device 1 is a handy-type device to be held in the hand of an operator and operated while being moved. The wireless tag communication device 1 may be mounted on a moving body operated by the operator.

The wireless tag communication device 1 according to the embodiment reads an RFID tag attached to an article while a position and an orientation thereof are changed by an operation of the operator. For example, the wireless tag communication device 1 operates as a search device for searching for an article, to which an RFID tag is attached, in a predetermined area (a search range) of a warehouse, a store or the like. The wireless tag communication device 1 serving as a search device continuously reads the RFID tag to be searched while a position thereof is changed by the operation of the operator.

The wireless tag communication device 1 reads tag information recorded in an RFID tag existing in a reading area (a reading range) by receiving a response signal from the RFID tag. Further, the wireless tag communication device 1 acquires information such as an RSSI value and a phase value from the response (reception) signal from the RFID tag. The wireless tag communication device 1 stores the tag information, the RSSI value, and the phase value obtained from the reception signal together with information such as the position and the orientation of the own device as a reading result in the memory.

In a configuration example illustrated in FIG. 1, the wireless tag communication device 1 includes a reader device (base device) 10 and an information terminal device 13 serving as a user interface. The reader device 10 may be provided as the wireless tag communication device 1. In this case, the wireless tag communication device 1 as the reader device 10 is operated in a state where the information terminal device 13 as an external device is set as a user interface.

The reader device 10 includes a casing in which an RFID tag interface including an antenna and a communication control circuit is installed. In the reader device 10, the antenna is provided so as to have the strongest directivity in a direction of an arrow a shown in FIG. 1. Here, it is assumed that the direction of the arrow a is a front (front side) direction of the wireless tag communication device 1. Further, it is assumed that the front direction of the wireless tag communication device 1 is an orientation of the antenna.

The reader device 10 includes a grip portion 11 and a holding portion 12 in addition to a configuration of a control system to be described later. The grip portion 11 is a portion to be gripped by an operator. The holding portion 12 is implemented by a tool for holding the information terminal device 13. The holding portion 12 holds the information terminal device 13 such that a display screen of a display 14 of the information terminal device 13 faces the operator who grips the grip portion 11. The wireless tag communication device 1 is operated by an operator gripping the grip portion 11 in a state where the information terminal device 13 is set in the holding portion 12.

The information terminal device 13 includes the display 14 and an input device 15. The display 14 and the input device 15 are, for example, display devices with a touch panel. In a state where the information terminal device 13 is set in the holding portion 12 of the reader device 10, the operator can visually recognize a screen displayed by the display 14. In addition, in the state where the information terminal device 13 is set in the holding portion 12 of the reader device 10, an operation instruction of the operator is input to the input device 15.

The wireless tag communication device 1 continuously reads an RFID tag while being operated by the operator. For example, the operator moves while gripping the grip portion 11 to change the position of the wireless tag communication device 1 provided with the antenna (the position of the own device). The wireless tag communication device 1 repeatedly reads an RFID tag in a reading area set by the orientation of the antenna and a magnitude of a radio wave output from the antenna while estimating the position of the own device.

The wireless tag communication device 1 specifies (estimates) the position of the own device using a self-estimation technique. For example, the wireless tag communication device 1 specifies, based on an image taken by a camera, a self position (the position of the communication device) by a self-position estimation method used in AR (augmented reality) technology. The method, the configuration, and the like for specifying the position of the own device that are used in the wireless tag communication device 1 are not limited to specific ones as long as the self position can be specified even in a room or the like.

Based on the reading result of the RFID tag in the reading area set based on the orientation of the antenna and the magnitude of the radio wave output from the antenna, the wireless tag communication device 1 determines whether the RFID tag to be searched exists in the reading area. For example, the wireless tag communication device 1 stores, in the memory, reading results of the RFID tag to be searched that are obtained in a plurality of reading areas with a plurality of moved positions of the own device as base points. For example, the wireless tag communication device 1 stores information such as tag information, a phase value, an antenna orientation, and an output value in the memory as a reading result of an RFID tag. The wireless tag communication device 1 sets a reading result including tag information on the RFID tag to be searched as a reading result of a specific RFID tag and stores, in the memory, the reading result in association with information (position information) indicating a self position of the wireless tag communication device 1.

The wireless tag communication device 1 estimates the position where the RFID tag to be searched exists based on reading results obtained at a plurality of different self positions, the reading results being stored in the memory. For example, the wireless tag communication device 1 estimates the position (tag position) of the RFID tag to be searched based on reading results obtained by reading the RFID tag to be searched at three or more different self positions at a predetermined interval.

Next, a configuration of the control system in the wireless tag communication device 1 according to the embodiment will be described.

Figure 2:
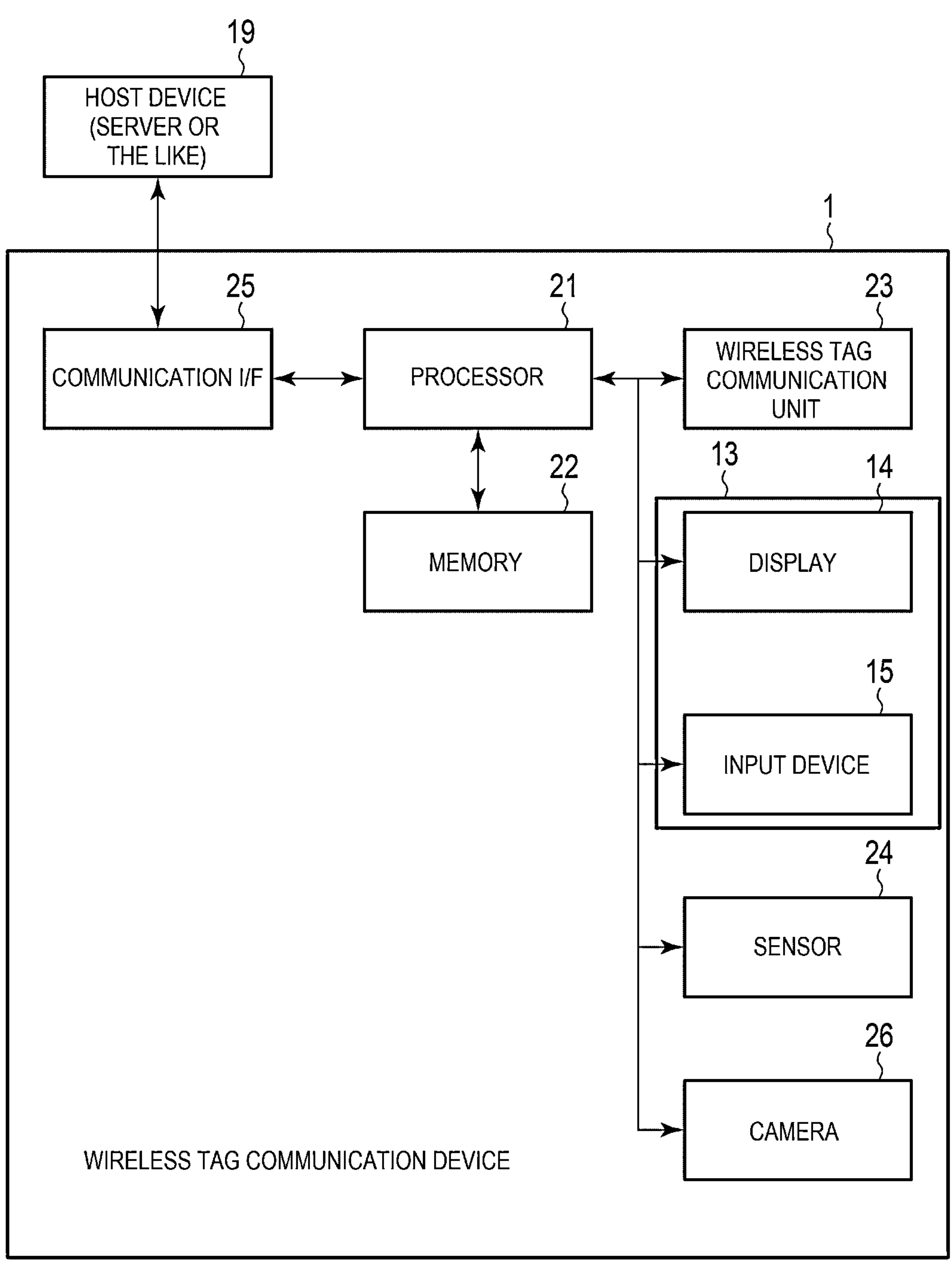
FIG. 2 is a block diagram schematically illustrating a first configuration example of a control system in the wireless tag communication device according to the embodiment.

FIG. 2 is a block diagram schematically illustrating a first configuration example of the control system in the wireless tag communication device 1 according to the embodiment.

In the configuration example illustrated in FIG. 2, the wireless tag communication device 1 includes a processor 21, a memory 22, a wireless tag communication unit 23, a sensor 24, a communication interface (I/F) 25, a camera 26, the display 14, and the input device 15.

The processor 21 controls the units. The processor 21 includes, for example, an arithmetic circuit such as a CPU. The processor 21 implements control of the units and various types of data processing by executing a program. The processor 21 may include an internal memory. The processor 21 executes various types of processing by executing programs stored in the memory 22 or the like.

The memory 22 includes various memories. For example, the memory 22 includes memories such as a ROM, a RAM, and an NVM. The ROM is a non-rewritable nonvolatile memory. The ROM stores a program or the like executed by the processor 21. The RAM is a volatile memory that temporarily stores data. The RAM operates as a working memory or a buffer memory.

The NVM of the memory 22 is a rewritable nonvolatile memory. The memory 22 stores information such as control information, setting information, and processing results in the NVM. In addition, the memory 22 stores, in the NVM, various programs for the processor 21 to execute various types of processing to be described later. For example, the memory 22 stores, in the NVM, an operation support program for outputting information for supporting the operator's operation on the casing. In addition, the memory 22 stores, in the NVM, an evaluation reference value for the operation support program to evaluate the operation on the casing.

The wireless tag communication unit 23 is a communication device constituting an RFID interface for communicating with an RFID tag. The wireless tag communication unit 23 is, for example, a communication device including a communication control circuit and an antenna. The wireless tag communication unit 23 may be implemented by a connection interface to be connected to an external antenna.

In the wireless tag communication unit 23, the communication control circuit includes a control circuit for communicating with the RFID tag via the antenna. The communication control circuit causes the antenna to transmit, at a set output value, a transmission signal (a radio wave) supplied from the processor 21. The antenna outputs the transmission signal supplied from the communication control circuit as a radio wave receivable by the RFID tag. The wireless tag communication unit 23 sets a range (a reading area, a reading range), in which the RFID tag can give a response, based on the orientation of the antenna and the output value of the radio wave output from the antenna.

In the wireless tag communication unit 23, the communication control circuit not only outputs a transmission signal to the antenna but also supplies a signal received by the antenna as reception data to the processor 21. The antenna receives a response signal from the RFID tag, and the communication control circuit processes the response signal (a reception signal) received by the antenna and supplies the processed signal to the processor 21. For example, the communication control circuit supplies tag information included in the reception signal from the RFID tag, an RSSI value indicating a strength of the reception signal, and a phase value to the processor 21.

The sensor (sensor group) 24 includes a sensor that detects a position of the wireless tag communication device 1 or a change in position. For example, the sensor 24 is an acceleration sensor, a gyro sensor, or a geomagnetic field (azimuth) sensor. The sensor 24 may include a plurality of types of sensors. The sensor 24 may include a position detection sensor configured to detect a position of the wireless tag communication device 1. The sensor 24 is an example of the position detection sensor that detects information indicating a self position (the position of the communication device).

The communication I/F 25 is an interface for communicating with an external device. The communication I/F 25 is a communication interface for communicating with a host device 19 such as a server. The communication I/F 25 may be an interface for wired communication or an interface for wireless communication.

The camera 26 takes an image. An imaging direction of the camera 26 changes according to the orientation of the wireless tag communication device 1. For example, the imaging direction in which the camera 26 performs imaging may be set to coincide with the orientation of the antenna of the wireless tag communication unit 23. The image taken by the camera 26 is used to estimate the position of the wireless tag communication device 1 (the position of the own device). The camera 26 is an example of the position detection sensor that information indicating a self position (the position of the communication device). For example, the wireless tag communication device 1 specifies, based on the image taken by the camera 26, a self position (the position of the communication device) by a self-position estimation method used in AR (augmented reality) technology.

The display 14 and the input device 15 provided in the information terminal device 13 are connected to the processor 21 via an internal interface. The display 14 is a device configured to display information. For example, the display 14 displays a display screen instructed by the processor 21. The input device 15 is a device for an operator to input an operation instruction or the like. The input device 15 supplies information indicating contents instructed by the operator to the processor 21.

The wireless tag communication device 1 includes a power supply that supplies power for operation. The handy-type wireless tag communication device 1 includes, for example, a rechargeable battery (a secondary battery) as the power supply. The battery supplies source power for operating the units in the wireless tag communication device 1 to the units. The camera 26 in the wireless tag communication device 1 may be replaced with a device for specifying the position of the wireless tag communication device 1.

Next, the configuration of the control system in the wireless tag communication device 1 according to the embodiment will be described.

Figure 3:
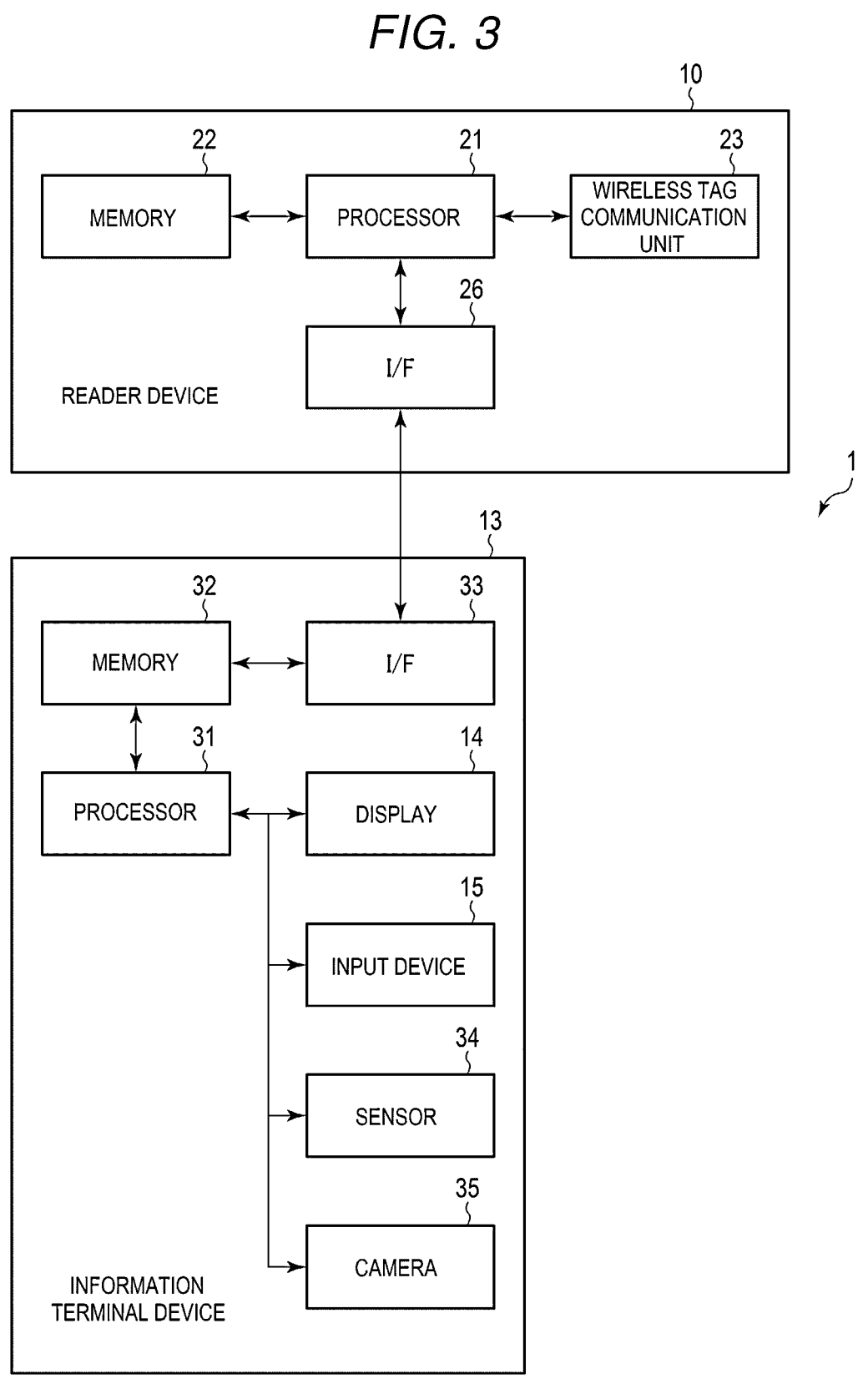

FIG. 3 is a block diagram schematically illustrating a second configuration example of the control system in the wireless tag communication device 1 according to the embodiment.

In the configuration example illustrated in FIG. 3, the reader device 10 serving as the wireless tag communication device 1 is connected to the information terminal device 13 serving as an external device. The reader device 10 serving as the wireless tag communication device 1 includes the processor 21, the memory 22, the wireless tag communication unit 23, and an interface (I/F) 26.

The processor 21 controls the units. The processor 21 includes, for example, an arithmetic circuit such as a CPU. The processor 21 implements control of the units and various types of data processing by executing a program.

The processor 21 may include an internal memory. The processor 21 executes various types of processing by executing programs stored in the memory 22 or the like.

The memory 22 includes various memories. For example, the memory 22 includes memories such as a ROM, a RAM, and an NVM. The ROM is a non-rewritable nonvolatile memory. The ROM stores a program or the like executed by the processor 21. The RAM is a volatile memory that temporarily stores data. The RAM operates as a working memory or a buffer memory. The NVM is a rewritable nonvolatile memory. The NVM stores information such as control information, setting information, and processing results. The NVM of the memory 22 stores various programs for the processor 21 to execute various types of processing to be described later.

The wireless tag communication unit 23 is a communication device constituting an RFID interface for communicating with an RFID tag. The wireless tag communication unit 23 is a communication device including a communication control circuit and an antenna. The wireless tag communication unit 23 may be implemented by a connection interface to be connected to an external antenna.

In the wireless tag communication unit 23, the communication control circuit includes a control circuit for communicating with the RFID tag via the antenna. The communication control circuit causes the antenna to transmit, at a set output value, a transmission signal (a radio wave) supplied from the processor 21. The antenna outputs the transmission signal supplied from the communication control circuit as a radio wave receivable by the RFID tag. The wireless tag communication unit 23 sets a range (a reading area), in which the RFID tag can give a response, based on an orientation of the antenna and the output value of the radio wave output from the antenna.

In the wireless tag communication unit 23, the communication control circuit not only outputs a transmission signal to the antenna but also supplies a signal received by the antenna as reception data to the processor 21. The antenna receives a response signal from the RFID tag, and the communication control circuit processes the response signal (a reception signal) received by the antenna and supplies the processed signal to the processor 21. For example, the communication control circuit supplies tag information included in the reception signal from the RFID tag, an RSSI value indicating a strength of the reception signal, and a phase value to the processor 21.

It is sufficient that the interface 26 corresponds to an interface 33 provided in the information terminal device 13. For example, the interface 26 may be physically connected to an interface provided in the information terminal device 13, such as a universal serial bus (USB) interface or a LAN interface. Further, the interface 26 may be a Bluetooth (registered trademark) interface or a WiFi (registered trademark) interface for wireless communication connection.

The reader device 10 serving as the wireless tag communication device 1 includes a power supply configured to supply power for operation. The handy-type wireless tag communication device 1 includes, for example, a rechargeable battery (a secondary battery) as the power supply. The battery supplies source power for operating the units in the wireless tag communication device 1 to the units.

In the configuration example illustrated in FIG. 3, the information terminal device 13 is set in the holding portion 12 of the reader device 10 serving as the wireless tag communication device 1. The information terminal device 13 includes the display 14, the input device 15, and the like, and may be any device that is communicably connected to the reader device 10 serving as the wireless tag communication device 1. The information terminal device 13 is, for example, a portable information processing device such as a smartphone or a tablet PC.

As illustrated in FIG. 3, the information terminal device 13 includes a processor 31, a memory 32, an interface (I/F) 33, a sensor 34, a camera 35, the display 14, and the input device 15.

The processor 31 controls the units and performs data processing. The processor 31 is, for example, a CPU. The processor 31 implements various operations by executing programs stored in the memory 32.

The interface 33 (a second is an interface communication interface) for communication connection with the interface 26. It is sufficient that the interface 33 corresponds to the interface 26. For example, the interface 33 is a LAN interface, a USB interface, a Bluetooth interface, or a WiFi interface.

The sensor (sensor group) 34 includes a sensor that detects a position of the information terminal device 13 or a change in position. For example, the sensor 34 is an acceleration sensor, a gyro sensor, or a geomagnetic field (azimuth) sensor. The sensor 34 may include a plurality of types of sensors. The sensor 34 may include a position detection sensor for detecting a position. In this case, the sensor 34 is an example of the position detection sensor that detects information indicating a self position (the position of the communication device). A part or all of sensors serving as the sensor 34 as described above may be provided in the reader device 10.

The camera 35 takes an image. An imaging direction of the camera 35 changes according to an orientation of the reader device 10 in a state where the information terminal device 13 is set to the reader device 10. For example, the imaging direction in which the camera 35 performs imaging may be set to coincide with the orientation of the antenna of the wireless tag communication unit 23 provided in the reader device 10.

The image taken by the camera 35 is used to estimate a position of the information terminal device 13 (a position of the wireless tag communication device 1 including the reader device 10 to which the information terminal device 13 is set, that is, a position of an own device). The camera 35 is an example of the position detection sensor that detects information indicating a self position (the position of the communication device). For example, the processor 31 of the information terminal device 13 specifies, based on an image taken by the camera 35, a self position by a self-position estimation method used in AR technology.

Next, a configuration of the wireless tag communication unit 23 in the wireless tag communication device 1 according to the embodiment will be described in detail.

As described above, the wireless tag communication unit (communication device) 23 includes a communication control circuit and an antenna. The communication control circuit of the wireless tag communication unit 23 includes a modulation circuit, a transmission-side amplifier circuit, a coupler, a reception-side amplifier circuit, a demodulation circuit, an output setting circuit, and a level detection circuit. The antenna of the wireless tag communication unit 23 is connected to the coupler of the communication control circuit. The antenna transmits and receives radio waves for communicating with an RFID tag. The communication control circuit processes a signal to be transmitted to the RFID tag via the antenna and a signal received from the RFID tag via the antenna.

The modulation circuit modulates a waveform signal (a carrier wave) with input transmission data. The transmission-side amplifier circuit amplifies an output signal of the modulation circuit. The coupler supplies an output signal of the transmission-side amplifier circuit to the antenna. With these configurations, the communication control circuit outputs the carrier wave modulated with the transmission data from the antenna.

The RFID tag receives a radio wave as a transmission signal transmitted from the antenna. The RFID tag recognizes, for example, a read command included in the transmission signal transmitted from the antenna. When the RFID tag recognizes the read command, the RFID tag outputs data (tag information) stored in one's own memory in the form of a radio wave, for example, by backscatter modulation.

The antenna receives the radio wave as a reception signal output from the RFID tag. The communication control circuit acquires, using the coupler, the reception signal received by the antenna, and supplies the acquired reception signal to the reception-side amplifier circuit. The reception-side amplifier circuit amplifies the reception signal received by the antenna. The demodulation circuit demodulates the data (the tag information) included in the reception signal amplified by the reception-side amplifier circuit.

The antenna of the wireless tag communication unit 23 has directivity, and is installed at a predetermined position of the wireless tag communication device 1 and faces a predetermined direction. The antenna is, for example, a planar antenna. The antenna of the wireless tag communication unit 23 is not limited to a specific configuration. The antenna is disposed in a casing so as to transmit an electromagnetic wave (an output signal) toward a communication area (a reading area) centered on a direction (for example, a-direction shown in FIG. 1) in which the directivity is maximum. The wireless tag communication device 1 is configured such that the direction in which the directivity of the antenna is maximum is the front (the a-direction shown in FIG. 1).

The communication control circuit of the wireless tag communication unit 23 sets, by using the output setting circuit, a strength (an output value) of a signal to be output. The transmission-side amplifier circuit amplifies a signal, which is supplied from the modulation circuit, to the output value set by the output setting circuit. The antenna transmits an output signal (a radio wave) at an output value set by the output setting circuit, which is supplied from the transmission-side amplifier circuit via the coupler.

The wireless tag communication unit 23 sets a range (a reading area) for transmitting a radio wave to which an RFID tag can give a response, the range corresponding to the orientation of the antenna and the output value of the radio wave output from the antenna. The reading area to be set by the wireless tag communication unit 23 is set based on the orientation of the antenna, the directivity of the antenna, and the output value of the output signal. The wireless tag communication unit 23 sets the reading area by controlling the output value of the output signal according to an instruction from the processor 21.

The communication control circuit of the wireless tag communication unit 23 processes a response signal (a reception signal) received by the antenna and supplies the processed signal to the processor 21. The communication control circuit supplies tag information included in the reception signal from the RFID tag, an RSSI value indicating a strength of the reception signal, and a phase value to the processor 21. For example, the communication control circuit of the wireless tag communication unit 23 detects, by using the level detection circuit, information for specifying the RSSI value indicating the strength of the reception signal (the response signal from the RFID tag) received by the antenna. In addition, the processor 21 acquires phase values of a plurality of reception signals received by the communication control circuit of the wireless tag communication unit 23 at different positions of of an own device, and detects a phase difference between the reception signals received at the different positions.

Next, a tag position estimation for estimating a position of an RFID tag to be searched (hereinafter, referred to as a target tag) by the wireless tag communication device 1 according to the embodiment will be described.

The wireless tag communication device 1 reads the target tag while moving a position (a self position) thereof in a state of being held by the operator. The wireless tag communication device 1 estimates (determines) directions of the target tag at a plurality of positions, and estimates a position of the target tag based on the directions of the target tag from the plurality of positions. The wireless tag communication device 1 acquires reading results obtained by reading the target tag at a plurality of positions (self positions). The wireless tag communication device 1 estimates the direction of the target tag from each position based on a reading result obtained at the corresponding position and a reading result obtained at a next position. Further, the wireless tag communication device 1 estimates the position of the target tag based on the directions of the target tag from the plurality of positions.

Figure 4:
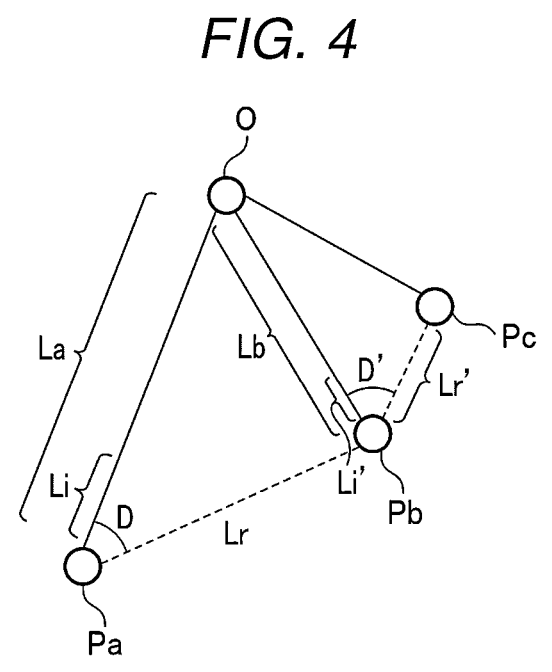

FIG. 4 is a diagram illustrating an example of a positional relationship when the wireless tag communication device 1 reads a target tag O at three different positions.

In the example illustrated in FIG. 4, it is assumed that the wireless tag communication device 1 reads the target tag O at a first position Pa, a second position Pb, and a third position Pc. For example, an operator who grips the wireless tag communication device 1 reads the target tag O while moving sequentially from the first position Pa, the second position Pb, to the third position Pc.

The processor 21 of the wireless tag communication device 1 holds, in the memory 22, read information including a position of an own device and a phase of a reception signal, as a result of reading the target tag at each position. The processor 21 determines a distance Lr between the first position Pa and the second position Pb based on the read information obtained at the first position Pa and the read information obtained at the second position Pb. The processor 21 determines a difference distance Li between a distance PaO from the first position Pa to the target tag O and a distance PbO from the second position Pb to the target tag O.

The difference distance Li is calculated by a difference (a phase difference) between the phase of the reception signal (a response wave) received at the first position Pa and the phase of the reception signal (a response wave) received at the second position Pb. That is, the difference distance ($Li=La-Lb$) between the distance La from the first position Pa to the target tag O and the distance Lb from the second position Pb to the target tag O is presented as a phase difference (a phase change amount). Accordingly, the processor 21 determines the difference distance Li based on the phase difference obtained from the read information obtained at the first position Pa and the read information obtained at the second position Pb.

The processor 21 derives (estimates) an angle D of an angle OAB from a ratio Li/Lr between the distance Lr and the difference distance Li. Here, the angle D derived (estimated) from the ratio Li/Lr is stored in the memory 22 in advance as a determination table. After calculating the ratio Li/Lr, the processor 21 determines the angle D corresponding to the calculated ratio Li/Lr based on the determination table.

In FIG. 4, an angle OPaPb is the angle D formed by a line segment PaPb and a line segment PaO. Therefore, when the positions (position coordinates) of the position Pa and the position Pb are specified, a direction from the position Pa to the target tag O (a straight line passing through the position Pa and the target tag O) can be specified. The processor 21 determines the direction from the position Pa to the target tag O based on the angle D of the angle OAB determined from the ratio Li/Lr.

By the same method as described above, the processor 21 determines a distance Lr' between the second position Pb and the third position Pc based on the read information obtained at the second position Pb and the read information obtained at the third position Pc. The processor 21 determines a difference distance Li' between the distance PbO from the second position Pb to the target tag O and a distance PcO from the third position Pc to the target tag O. The difference distance Li' is determined based on a phase difference obtained from the read information obtained at the second position Pb and the read information obtained at the third position Pc.

The processor 21 calculates a ratio Li'/Lr' between the distance Lr' and the difference distance Li', and determines an angle D' corresponding to the calculated Li'/Lr' based on the determination table. The processor 21 determines a direction of the target tag O from the second position Pb (a straight line passing through the position Pb and the target tag O) based on the angle D' of the angle OPbPc determined from the ratio Li'/Lr'.

The processor 21 determines (estimates) the position of the target tag O based on the direction of the target tag from the first position Pa and the direction of the target tag from the second position Pb. For example, the processor 21 determines an intersection between a straight line PaO passing through the first position Pa and the target tag O and a straight line PbO passing through the second position Pb and the target tag O as the position of the target tag O.

That is, the wireless tag communication device 1 determines (estimates) a direction from one position to the target tag based on the read information of the target tag at two positions. The wireless tag communication device 1 reads the target tag at three or more positions and determines directions to the target tag from a plurality of positions. The wireless tag communication device 1 determines the position of the target tag based on the directions from the plurality of positions to the target tag.

Next, a determination table for the wireless tag communication device 1 to determine a direction of a target tag will be described.

FIG. 5 is a diagram illustrating an example of a determination table stored in the memory 22 of the wireless tag communication device 1. FIG. 5 is a table illustrating a relationship between the angle D and the ratio Li/Lr, the ratio Li/Lr being between the distance Lr between two positions and the difference (difference distance) Li between the distances from the two positions to the target tag.

The determination table shown in FIG. 5 records values in two-dimensional coordinates in which a position of a search object (target tag) is set as an origin O (0, 0) and coordinates of a reference position A are (0, 8). (X, Y) in FIG. 5 indicates coordinates of a variation position B when a movement distance Lr from the reference position A is 0.5 m. An angle in FIG. 5 is an angle (angle OAB) formed by a straight line connecting the position O of the target tag and the reference position A and a straight line connecting the reference position A and the variation position B. A distance in FIG. 5 indicates a distance between the variation position B and the position O of the target tag.

The difference distance Li in FIG. 5 is a distance (Li=La−Lb) obtained by subtracting a distance Lb between the position O of the target tag and the variation position B from a distance La between the position O of the target tag and the reference position A. The difference distance Li is a distance calculated based on a phase change amount between a phase of a signal received from the target tag at the reference position A and a phase of a signal received from the target tag at the variation position B. The ratio Li/Lr in FIG. 5 is a ratio between the movement distance Lr and the difference distance Li.

Figure 6:
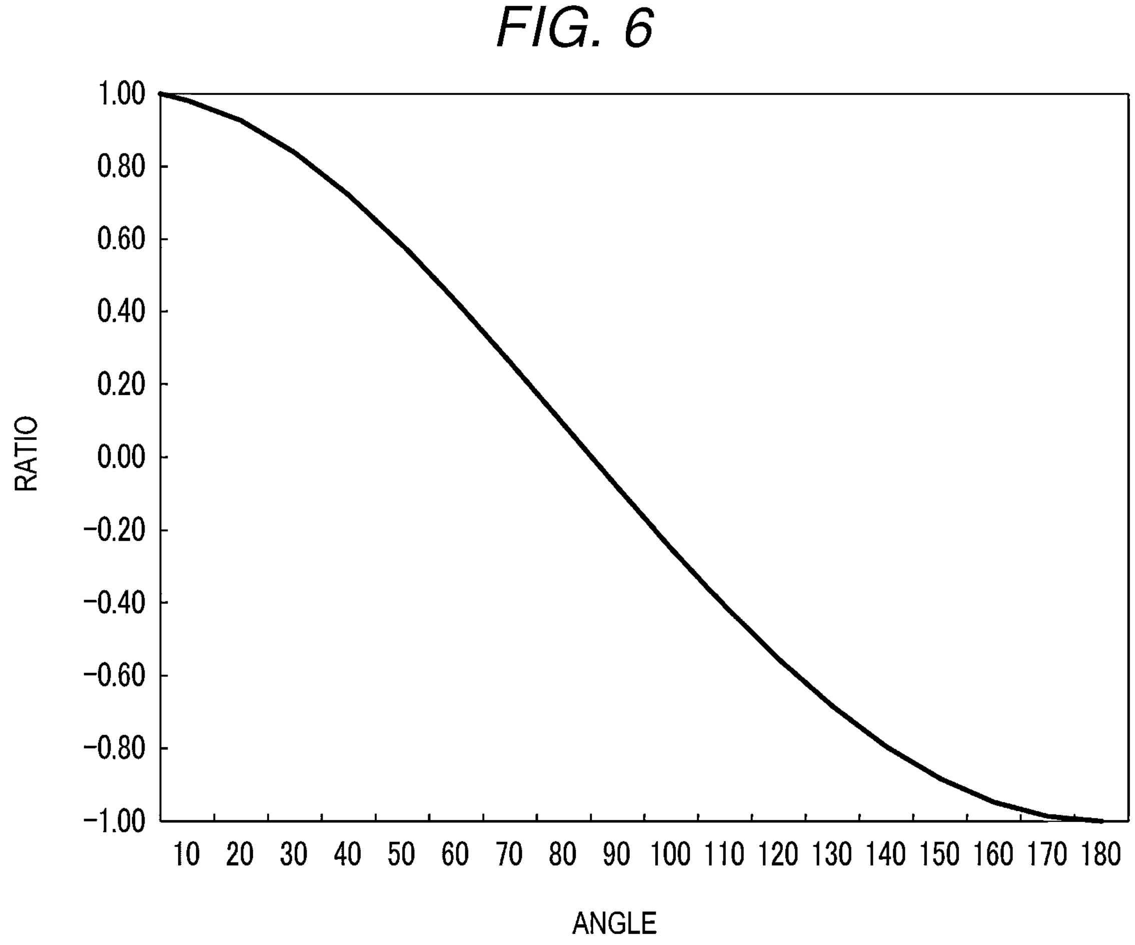
FIG. 6 is a graph for the wireless tag communication device according to the embodiment to estimate an angle based on a ratio between a distance between two positions and a difference between distances from the two positions to a target tag.

FIG. 6 is a graph illustrating the relationship between the angle specified based on the values shown in FIG. 5 and the ratio Li/Lr. According to the table shown in FIG. 5 or the graph shown in FIG. 6, the angle of the angle OAB can be determined based on the ratio Li/Lr. That is, when the coordinates of the position A, the coordinates of the position B, and the angle of the angle OAB are specified, the direction in which the target tag exists from the position A can be determined even if the coordinates of the target tag are unknown.

By using the table shown in FIG. 5 or the graph shown in FIG. 6, the angle D shown in FIG. 4 can be calculated based on the movement distance Lr and the difference distance Li. Similarly, the angle D' shown in FIG. 4 can be calculated based on the movement distance Lr' and the difference distance Li'. As a result, the position of the target tag illustrated in FIG. 4 can be determined based on the direction (angle D) from the position Pa to the target tag and the direction (angle D') of the target tag from the second position Pb.

Hereinafter, an example of a search including processing when the reading result of the target tag cannot be acquired during execution of the tag position estimation by the wireless tag communication device 1 according to the embodiment will be described.

The wireless tag communication device 1 estimates the position of the target tag based on the reading results of the target tag at three different positions according to the above-described tag position estimation. The wireless tag communication device 1 estimates the position of the target tag at a predetermined interval based on a reading result obtained by reading the target tag at a predetermined reading cycle. The predetermined interval is not limited to the reading cycle, and may be a predetermined cycle (time) different from the reading cycle, or may be a predetermined distance with respect to a movement distance of the self position.

In the actual operation of the wireless tag communication device 1, the wireless tag communication unit 23 may be temporarily unable to read the target tag. If there is a period in which the target tag cannot be read, the wireless tag communication device 1 may not be able to acquire the reading result obtained by reading the target tag at the predetermined interval. In order to estimate a position of a tag at a predetermined interval using the above-described tag position estimation, it is necessary to acquire the reading result obtained by reading the target tag at the predetermined interval and specify a distance of approaching the target tag.

The distance of approaching the target tag is specified by a phase change amount (a phase difference) in the reading result of the target tag at different self positions. Therefore, in order to estimate the position of the target tag at each predetermined interval, a reading result obtained by reading the target tag at each predetermined interval is required. In other words, if the target tag cannot be read at the predetermined interval (if the phase value cannot be obtained), the tag position cannot be estimated at the predetermined interval. The wireless tag communication device 1 according to the embodiment provides a search including processing of continuously reporting a tag position (an estimation result of the tag position) even if there is a period in which the target tag cannot be temporarily read.

Next, target tag reading performed by the wireless tag communication device 1 will be described.

Figure 7:
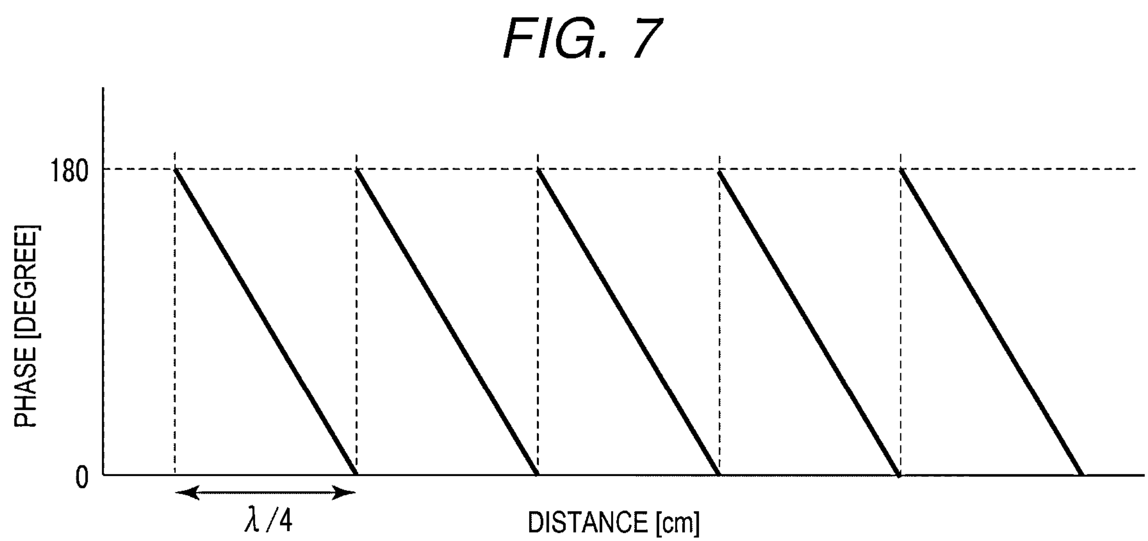
FIG. 7 is a diagram illustrating a change in phase in a reading result when a wireless tag communication unit 23 of the wireless tag communication device according to the embodiment continuously reads the target tag.

FIG. 7 is a diagram illustrating a change in phase in a reading result when the wireless tag communication unit 23 of the wireless tag communication device 1 continuously reads the target tag.

As illustrated in FIG. 7, when moving at a constant speed relative to the target tag, the phase in the reading result obtained by continuously reading the target tag periodically changes in a range of 0 degrees to 180 degrees. For example, in the example illustrated in FIG. 7, the phase varies from 0 degrees to 180 degrees for every distance of $\lambda/4$ (about 8 cm). The wireless tag communication unit 23 of the wireless tag communication device 1 actually reads the target tag at a predetermined reading cycle. Therefore, the actual reading result of the target tag is discrete data acquired at a predetermined reading cycle. If there is a period in which the target tag cannot be temporarily read, the reading result in the period does not exist.

Figure 8:
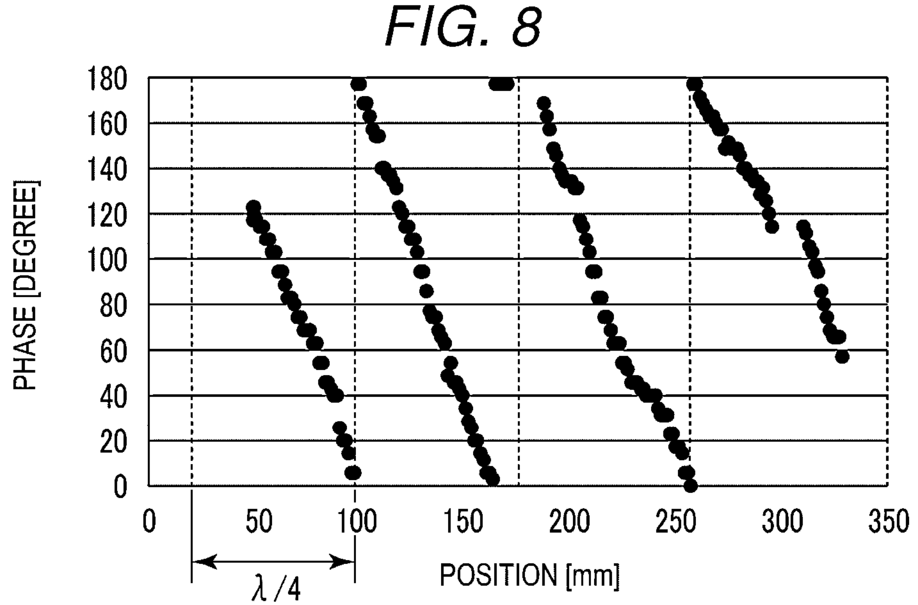
FIG. 8 is a diagram illustrating an example of plotting reading results (phases) obtained by reading the target tag at predetermined reading cycles by the wireless tag communication device according to the embodiment.
Figure 9:
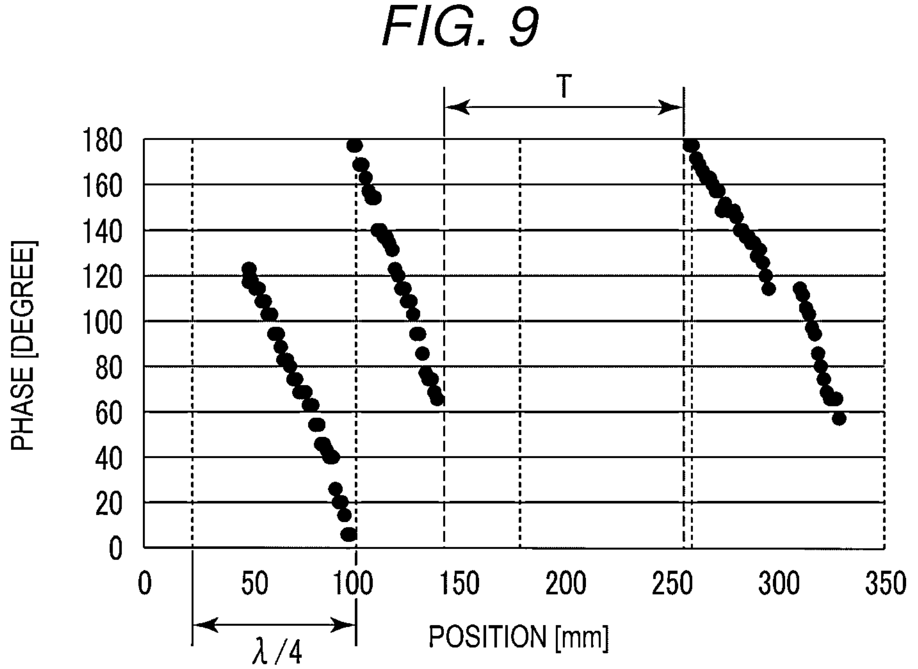
FIG. 9 is a diagram illustrating an example of plotting reading results (phases) when there is a period in which the wireless tag communication device according to the embodiment cannot read the target tag.

FIG. 8 is a diagram illustrating an example of plotting reading results (phases) obtained by reading the target tag at predetermined reading cycles. FIG. 9 is a diagram illustrating an example of plotting reading results obtained by reading the target tag at predetermined reading cycles when there is a period T in which the target tag cannot be read.

When actually searching for the target tag, the reading result of the target t tag is discrete data at each predetermined reading cycle in which the phase periodically changes in a range of 0 degrees to 180 degrees as illustrated in FIG. 8. When the wireless tag communication device 1 is temporarily unable to read the target tag, the period T in which the reading result of the target tag does not exist appears as illustrated in FIG. 9. In the above-described tag position estimation, the wireless tag communication device 1 cannot estimate the tag position in the period T in which no reading result is obtained.

The wireless tag communication device 1 according to the embodiment estimates the tag position based on a plurality of consecutive reading results at each predetermined interval. Further, the wireless tag communication device 1 can continuously report the tag position even if there is a period in which the target tag cannot be read temporarily and the target tag cannot be read at the predetermined interval. That is, the wireless tag communication device 1 according to the embodiment can continuously report the estimation result of the target tag with high accuracy even if there is a period in which the target tag cannot be read.

Hereinafter, first, second, and third processing examples will be described as the tag search performed by the wireless tag communication device 1 according to the embodiment.

First, a first tag search performed by the wireless tag communication device 1 according to the embodiment will be described as the first processing example.

Figure 10:
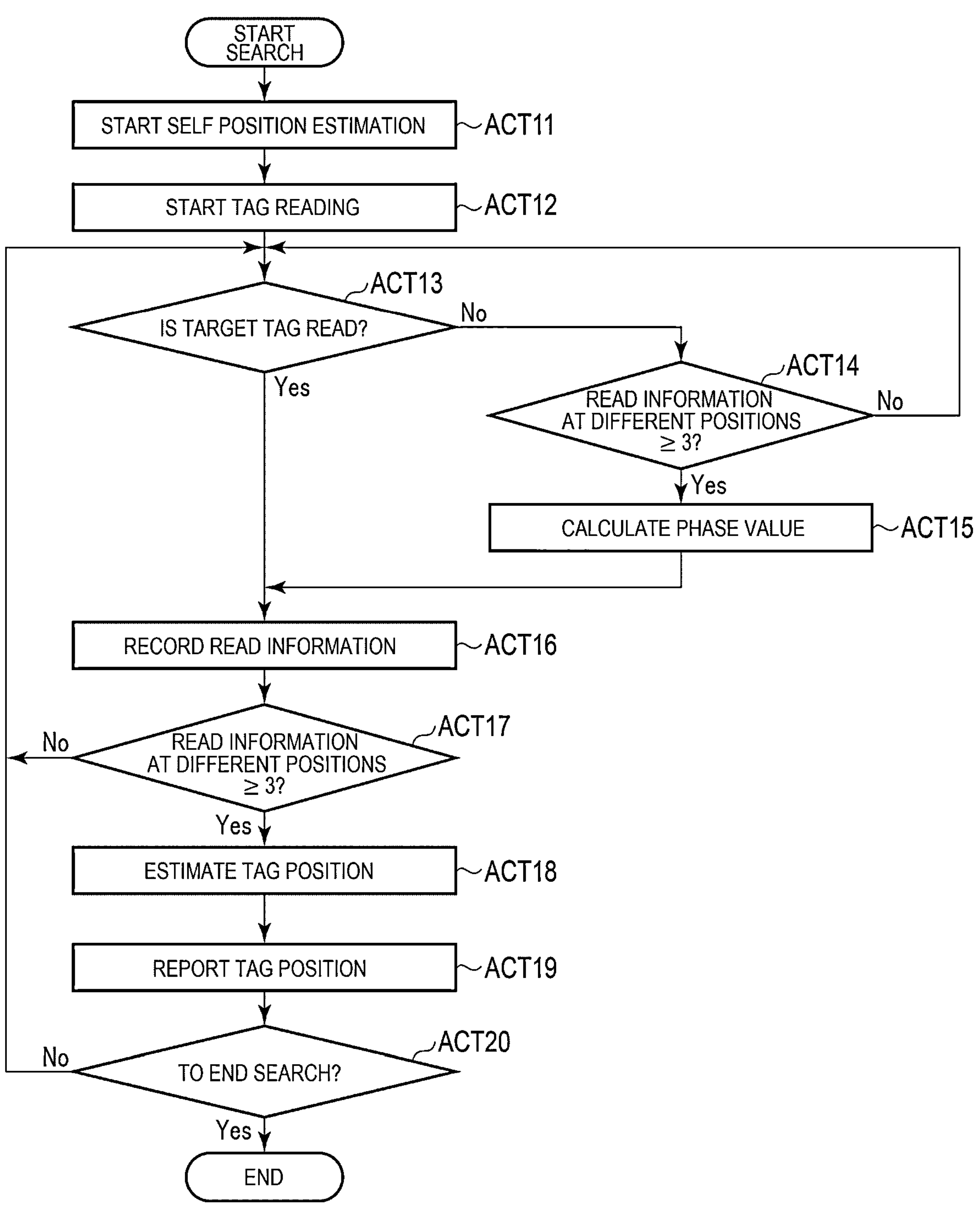
FIG. 10 is a flowchart illustrating an operation example of a first tag search performed by the wireless tag communication device according to the embodiment.

FIG. 10 is a flowchart illustrating an operation example of the first tag search performed by the wireless tag communication device 1 according to the embodiment.

The processor 21 of the wireless tag communication device 1 operates in a search mode after registering an operator, who is a searcher, based on information input via the input device 15. The processor 21 sets an RFID tag to be searched (a target tag) that is designated by the operator. After setting the target tag, the processor 21 starts searching of the target tag in response to an instruction to start searching from the operator. When starting the searching of the target tag, the processor 21 starts an estimation of a position of an own device (a self position) and reading of the target tag (ACT 11 and ACT 12).

As the estimation of the self position, the processor 21 estimates the self position based on a detection signal detected by the position detection sensor such as the sensor 24 or 34. As the self position, the processor 21 may estimate a relative position from a processing start position or may estimate an absolute position. For example, the processor 21 repeatedly executes the estimation of the self position at a specific timing as the estimation of the self position. The processor 21 may estimate the self position at a target tag reading cycle to be described later. The processor 21 stores, in the memory 22, position information (the self position) as an estimation result of the self position.

As the reading of the target tag, the processor 21 performs processing of reading the target tag at a predetermined reading cycle by the wireless tag communication unit 23. The wireless tag communication unit 23 transmits a response request (a read command), and the processor 21 receives, as a reception signal, a response wave output from the RFID tag in a reading area in response to the response request. Based on tag information included in the reception signal, the processor 21 determines whether the RFID tag to be searched (the target tag) is read.

When receiving the signal from the target tag, the processor 21 stores (records), in the memory 22, a reading result including phase information on the signal received from the target tag as a reading result of the target tag. The processor 21 stores the reading result of the target tag in the memory 22 every time the reading is executed at the predetermined reading cycle. The processor 21 stores, in the memory 22, the reading result of the target tag in association with information indicating a timing when the reading is executed. For example, the processor 21 stores, in the memory 22, the reading result of the target tag at the predetermined reading cycle in association with the position information as the estimation result of the self position. If the target tag cannot be read, the processor 21 may store, in the memory 22, the reading result indicating that the target tag cannot be read in association with the estimation result of the self position.

The processor 21 acquires the reading result of the target tag at each predetermined interval while executing the estimation of the self position and the reading of the tag. The predetermined interval is an interval for acquiring three or more pieces of read information (phase information and self position) for estimating the position of the target tag. The predetermined interval is an interval for estimating the tag position, and may be set to any desired information. For example, the predetermined interval may be a predetermined time (cycle) different from the reading cycle in which the reading of the target tag is performed, or may be a predetermined distance with respect to a movement (variation) distance of the self position.

The processor 21 determines whether the target tag is read at each predetermined interval (ACT 13). If the target tag is read at the predetermined interval (ACT 13, YES), the processor 21 records, in the memory 22, read information in which the reading result including the phase information on the signal from the target tag is associated with the position information indicating the self position (ACT 16). Accordingly, the memory 22 stores the read information at each predetermined interval as information for estimating the position of the target tag at each predetermined interval.

If the target tag is not read at the predetermined interval (ACT 13, NO), the processor 21 determines whether three or more pieces of read information are recorded in the memory 22 (ACT 14). If three or more pieces of read information are not recorded in the memory 22 (ACT 14, NO), the processor 21 returns to the above ACT 13.

If three or more pieces of read information are recorded in the memory 22 (ACT 14, Yes), the processor 21 calculates, based on a tag position (an estimated tag position) estimated based on three pieces of read information recorded in the memory 22 and the self position, a phase value (phase information) to be complemented as the reading result of the target tag (ACT 15). That is, the processor 21 calculates (estimates) a phase value of a signal assumed to be received from the target tag at the timing (the timing when the target tag is not actually read) based on the self position and the estimated tag position. For example, the phase value of the reception signal from the target tag varies as illustrated in FIG. 7. Accordingly, the processor 21 can estimate (calculate) the phase value at the timing based on the self position at the timing and the most recently estimated tag position.

After calculating the phase value when the target tag cannot be read, the processor 21 complements the calculated phase value as the reading result of the target tag at the timing. The processor 21 records, in the memory 22, the reading result of the target tag complemented by the calculated phase value and the position information on the self position as the read information at the timing (ACT 16). Accordingly, the processor 21 can record, in the memory 22, the read information including the complemented reading result and the self position even at the timing when the target tag cannot be read.

When the read information is recorded (additionally written) in the memory 22, the processor 21 determines whether there are three or more pieces of read information at different positions that include the read information recorded in the memory 22 (ACT 17). If three or more pieces of read information are not present at different positions (ACT 17, No), the processor 21 cannot perform the estimation of the tag position for the target tag, and thus returns to ACT 13.

If there are three or more pieces of read information at different positions (ACT 17, Yes), the processor 21 executes the tag position estimation for the target tag using three pieces of read information including the read information recorded in the memory 22 (ACT 18). That is, the processor 21 selects most recent three pieces of read information from the read information that is recorded in the memory 22 including the read information on the complemented reading result of the target tag. The processor 21 estimates the position of the target tag by executing the above-described tag position estimation using the selected three pieces of read information.

For example, it is assumed that the processor 21 selects first, second, and third read information at the predetermined interval as the tag position estimation. In this case, the processor 21 specifies a direction from a first position indicated by the first read information to the target tag and a direction from a second position indicated by the second read information to the target tag. The direction from the first position to the target tag is specified based on a ratio between the distance Lr from the first position to the second position and the difference distance Li of distances to the target tag based on the relationship illustrated in FIG. 5 or FIG. 6. The direction from the second position to the target tag is specified based on a ratio between the distance Lr' from the second position to the third position and the difference distance Li' of distances to the target tag. When the directions from the plurality of positions to the target tag are specified, the processor 21 determines (estimates) the position of the target tag based on the coordinates of the respective positions and the directions from the respective positions to the target tag.

When the position of the target tag is estimated, the processor 21 reports the estimated position of the target tag (ACT 19). For example, the processor 21 displays, on the display 14, information indicating the estimated position of the target tag. Accordingly, the operator can directly know not a direction in which the target tag exists but the position where the target tag exists.

The processor 21 receives an instruction to end the search while reporting the position of the target tag (ACT 20). For example, the processor 21 receives an instruction to end the search from the operator using the input device 15. If there is no instruction to end the search (ACT 20, NO), the processor 21 returns to ACT 13 and repeatedly executes the above-described processing. If the instruction to end the search is given (ACT 20, YES), the processor 21 ends the searching of the target tag.

As described above, according to the first search, the wireless tag communication device checks whether the target tag is read at each predetermined interval. When the target tag is read, the wireless tag communication device records, in the memory, the read information including the reading result including the phase of the signal from the target tag and the self position. When the target tag cannot be read, the wireless tag communication device calculates the phase value at the timing based on the self position and the estimated tag position. The wireless tag communication device records, in the memory, the information including the calculated phase value and the self position as the read information at the timing when the target tag cannot be read. The wireless tag communication device estimates the tag position using three pieces of read information recorded in the memory at each predetermined interval, and reports the tag position as the estimation result.

Accordingly, the wireless tag communication device can obtain the estimation result of the position of the target tag at each predetermined interval even if there is a period in which the target tag can not actually be read. As a result, the wireless tag communication device can update the position of the target tag at each predetermined interval and can continuously report the position of the target tag with high accuracy.

Next, a second tag search performed by the wireless tag communication device 1 according to the embodiment will be described as the second processing example.

Figure 11:
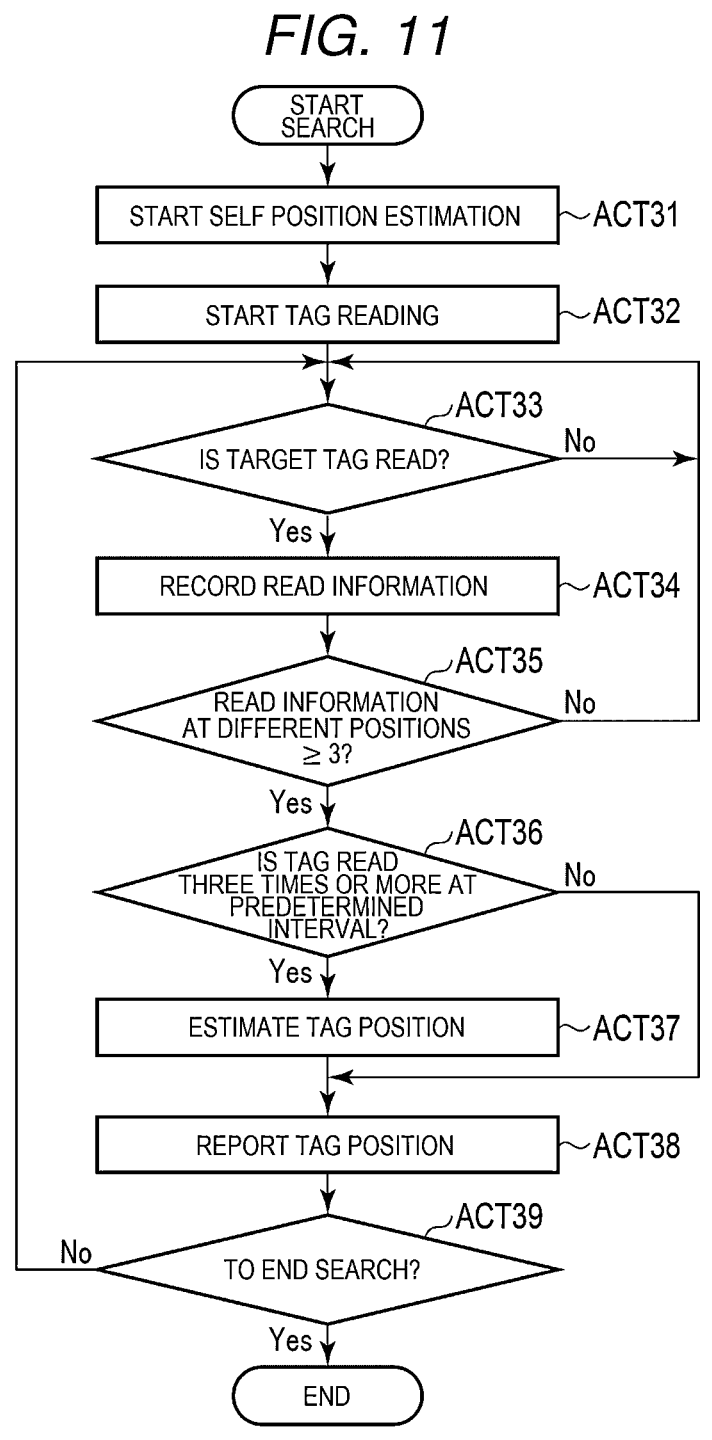

FIG. 11 is a flowchart illustrating an operation example of the second tag search performed by the wireless tag communication device 1 according to the embodiment.

The processor 21 of the wireless tag communication device 1 operates in a search mode after registering an operator, who is a searcher, based on information input via the input device 15. The processor 21 sets an RFID tag to be searched (a target tag) that is designated by the operator. After setting the target tag, the processor 21 starts searching of the target tag in response to an instruction to start searching from the operator. When starting the searching of the target tag, the processor 21 starts an estimation of a position of an own device (a self position) and reading of the target tag (ACT 31 and ACT 32).

As the estimation of the self position, the processor 21 estimates the self position based on a detection signal detected by the sensor 24 or 34. As the self position, the processor 21 may estimate a relative position from a processing start position or may estimate an absolute position. The processor 21 repeatedly executes the estimation of the self position at a specific timing as the estimation of the self position. For example, the processor 21 may estimate the self position at a target tag reading cycle to be described later. The processor 21 stores, in the memory 22, position information as an estimation result of the self position.

As the reading of the target tag, the processor 21 executes processing of reading the target tag at predetermined reading cycle by the wireless tag communication unit 23. The wireless tag communication unit 23 transmits a response request (a read command), and the processor 21 receives, as a reception signal, a response wave output from the RFID tag in a reading area in response to the response request. Based on tag information included in the reception signal, the processor 21 determines whether the RFID tag to be searched (the target tag) is read.

When receiving the signal from the target tag, the processor 21 stores (records), in the memory 22, a reading result including phase information on the signal received from the target tag as a reading result of the target tag. The processor 21 stores the reading result of the target tag in the memory 22 every time the reading is executed at the predetermined reading cycle. The processor 21 stores, in the memory 22, the reading result of the target tag in association with information indicating a timing when the reading is executed. For example, the processor 21 stores, in the memory 22, the reading result of the target tag at the predetermined reading cycle in association with the position information as the estimation result of the self position. If the target tag cannot be read, the processor 21 may store, in the memory 22, the reading result indicating that the target tag cannot be read in association with the estimation result of the self position.

The processor 21 acquires the reading result of the target tag at each predetermined interval (predetermined cycle or predetermined distance) while executing the estimation of the self position and the reading of the tag. The processor 21 determines whether the target tag is read at each predetermined interval (ACT 33). If the target tag is not read at the predetermined interval (ACT 33, NO), the processor 21 returns to ACT 33.

If the target tag is read (ACT 33, YES), the processor 21 records, in the memory 22, read information in which the reading result of the target tag including the phase information on the signal from the target tag is associated with the position information indicating the self position (ACT 34). Accordingly, the memory 22 stores the read information at each predetermined interval as information for estimating the position the 41 of target tag at each predetermined interval.

When the read information is recorded in the memory 22, the processor 21 determines whether three or more pieces of read information at different positions are recorded in the memory 22 (ACT 35). If three or more pieces of read information at different positions are not recorded in the memory 22 (ACT 35, NO), the processor 21 returns to ACT 33.

If three or more pieces of read information at different positions are recorded in the memory 22 (ACT 35, Yes), the processor 21 determines whether most recent three pieces of read information including the read information recorded in the memory 22 are consecutive at the predetermined interval (ACT 36). That is, the processor 21 determines whether three pieces of consecutive read information at different positions at the predetermined interval are recorded in the memory 22, the three pieces of consecutive read information including latest read information.

If the most recent three pieces of read information are not consecutive at the predetermined interval (ACT 36, No), the processor 21 proceeds to ACT 38 without estimating the tag position. That is, unless the most recent three pieces of read information are consecutive at the predetermined interval, the processor 21 continues to report (display) the tag position that is currently being reported (displayed). For example, if the most recent three pieces of read information are not consecutive at the predetermined interval, the processor 21 continues to display the tag position displayed on the display 14 without updating the tag position.

If the most recent three pieces of read information are consecutive at the predetermined interval (ACT 36, Yes), the processor 21 estimates the position of the target tag using the three pieces of consecutive read information at the predetermined interval (ACT 37). The processor 21 estimates the position of the target tag by the above-described tag position estimation. When the position of the target tag is estimated, the processor 21 reports the estimated position of the target tag (ACT 38). For example, the processor 21 stores the estimation result of the tag position in the memory 22, and updates the position of the target tag displayed on the display 14 to the position of the target tag estimated by the latest tag position estimation. Accordingly, the processor 21 can report the position of the target tag that is estimated when the three pieces of consecutive read information at the predetermined interval can be obtained.

The processor 21 receives an instruction to end the search while reporting the position of the target tag (ACT 39). If there is no instruction to end the search (ACT 39, NO), the processor 21 returns to ACT 33 and repeatedly executes the above-described processing. If the instruction to end the search is given (ACT 39, YES), the processor 21 ends the searching of the target tag.

As described above, according to the second search, the wireless tag communication device records, in the memory, the read information including the reading result of the target tag and the self position when the target tag is read at the predetermined interval. The wireless tag communication device estimates the tag position when the three pieces of consecutive read information at the predetermined interval are recorded in the memory and reports the tag position as the estimation result.

Accordingly, the wireless tag communication device can update the tag position to be reported only when the consecutive read information at the predetermined interval is obtained. As a result, the wireless tag communication device can report the position of the target tag with high accuracy that is obtained based on the consecutive read information at the predetermined interval.

Next, a third tag search performed by the wireless tag communication device 1 according to the embodiment will be described as the third processing example.

Figure 12:
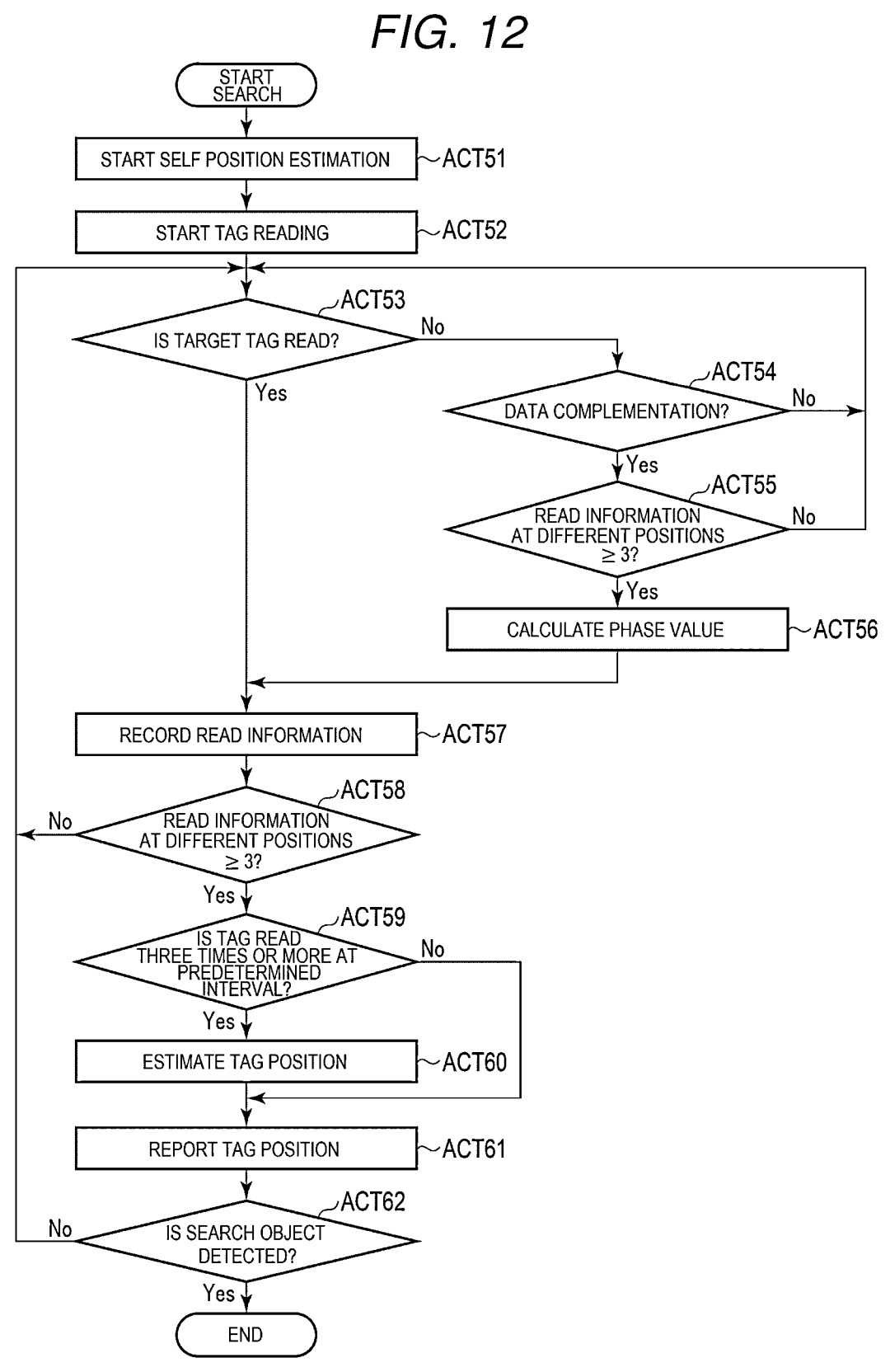

FIG. 12 is a flowchart illustrating an operation example of the third tag search performed by the wireless tag communication device 1 according to the embodiment.

The processor 21 of the wireless tag communication device 1 operates in a search mode after registering an operator, who is a searcher, based on information input via the input device 15. The processor 21 sets an RFID tag to be searched (a target tag) that is designated by the operator. After setting the target tag, the processor 21 starts searching of the target tag in response to an instruction to start searching from the operator. When starting the searching of the target tag, the processor 21 starts an estimation of a position of an own device (a self position) and reading of the target tag (ACT 51 and ACT 52).

Similar to the above ACT 11 or ACT 31, the processor 21 repeatedly executes the estimation of the self position based on a detection signal detected by the sensor 24 or 34 at a specific timing. The processor 21 stores, in the memory 22, position information as an estimation result of the self position. For example, the processor 21 stores, in the memory 22, the position information in association with information indicating the timing when the self position is estimated.

Similar to the above ACT 12 or 32, the processor 21 causes the wireless tag communication unit 23 to execute processing of reading the target tag at a predetermined reading cycle. The processor 21 stores the reading result of the target tag at a predetermined reading cycle in the memory 22. Here, the processor 21 stores, in the memory 22, the reading result of the target tag at the predetermined reading cycle in association with the position information (self position) as the estimation result of the self position.

The processor 21 acquires the reading result of the target tag at each predetermined interval (predetermined cycle or predetermined distance) while executing the estimation of the self position and the reading of the tag. The processor 21 determines whether the target tag is read based on the reading result of the target tag that is acquired at each predetermined interval (ACT 53). If the target tag is read (ACT 53, YES), the processor 21 proceeds to ACT 57.

In ACT 57, the processor 21 records, in the memory 22, read information in which the reading result of the target tag including a phase value (phase information) of the signal from the target tag is associated with the position information indicating the self position (ACT 57). Accordingly, the memory 22 stores the read information at each predetermined interval as information for estimating the position of the target tag at each predetermined interval.

If the target tag is not read at the predetermined interval (ACT 53, NO), the processor 21 determines whether to execute complementation of data (read information) (ACT 54). Here, it is assumed that whether to complement the read information with a phase value estimated as the reading result at the timing when the target tag cannot be read is set in advance. For example, the processor 21 sets whether to complement the read information according to an instruction of setting by the operator.

If the complementation of read information is not performed, the processor 21 determines that there is no read information at the timing, and returns to ACT 53.

If the complementation of read information is performed (ACT 54, Yes), the processor 21 determines whether three or more pieces of read information at different positions are recorded in the memory 22 (ACT 55). If three or more pieces of read information at different positions are not recorded in the memory 22 (ACT 55, NO), the processor 21 returns to ACT 53.

If three or more pieces of read information at different positions are recorded in the memory 22 (ACT 55, Yes), the processor 21 calculates a phase value (phase information) at the timing based on the self position and the estimated tag position (ACT 56). For example, the processor 21 calculates (estimates) a phase value assumed as a phase of a reception signal from the target tag based on the self position at the timing and the estimated tag position. As a specific example, the processor 21 assumes a phase variation as illustrated in FIG. 7, and calculates the phase value at the timing based on the self position at the timing and the most recently estimated tag position.

After calculating the phase value as complementary data, the processor 21 generates the reading result of the calculated phase value and the self position as the read information at the timing. The processor 21 records, in the memory 22, the read information generated based on the phase value calculated as the complementary data as the read information at the timing (ACT 57). Accordingly, the processor 21 can record, in the memory 22, the read information including the reading result of the complemented phase value and the self position (position information) even at the timing when the target tag cannot be read.

When the read information is recorded (additionally written) in the memory 22, the processor 21 determines whether there are three or more pieces of read information at different positions that are recorded in the memory 22 (ACT 58). If three or more pieces of read information at different positions are not present (ACT 58, No), the processor 21 cannot perform the tag position estimation for the target tag, and thus returns to ACT 53.

If there are three or more pieces of read information at different positions (ACT 58, Yes), the processor 21 determines whether most recent three pieces of read information at different positions are consecutive at the predetermined interval (ACT 59). That is, the processor 21 determines whether three pieces of read information at different positions that include the latest read information recorded in the memory 22 are consecutive at the predetermined interval.

If the most recent three pieces of read information are not consecutive at the predetermined interval (ACT 59, No), the processor 21 proceeds to ACT 61 without estimating the tag position. That is, unless the most recent three pieces of read information are consecutive at the predetermined interval, the processor 21 continues to report the current tag position. For example, if the most recent three pieces of read information are not consecutive at the predetermined interval, the processor 21 continues to display the tag position displayed on the display 14 without updating the tag position.

If the most recent three pieces of read information are consecutive at the predetermined interval (ACT 59, Yes), the processor 21 estimates the position of the target tag using the most recent three pieces of consecutive read information at the predetermined interval (ACT 60). That is, the processor 21 estimates the position of the target tag by the above-described tag position estimation using the most recent three pieces of read information. When the position of the target tag is estimated, the processor 21 reports the estimated position of the target tag (ACT 61). For example, the processor 21 updates the position of the target tag displayed on the display 14 to the position of the target tag estimated in the tag position estimation. Accordingly, the processor 21 can report the position of the target tag updating to the position estimated using the most recent three pieces of consecutive read information at the predetermined interval.

The processor 21 receives an instruction to end the search while reporting the position of the target tag (ACT 62). When there is no instruction to end the search (ACT 62, NO), the processor 21 returns to ACT 53 and repeatedly executes the above-described processing. When the instruction to end the search is given (ACT 62, YES), the processor 21 ends the searching of the target tag.

As described above, according to the third search, the wireless tag communication device records, in the memory, the read information including the reading result of the target tag and the self position when the target tag is read at the predetermined interval. If the target tag cannot be read at the predetermined interval, the wireless tag communication device records, in the memory, the read information complemented with the phase value calculated based on the self position and the estimated tag position. The wireless tag communication device estimates the tag position when three pieces of consecutive read information at the predetermined interval are recorded in the memory and reports the tag position as the estimation result.

Accordingly, the wireless tag communication device can complement the read information if the target tag cannot be read at the predetermined interval, and can secure the read information at each predetermined interval. Further, the wireless tag communication device can update the tag position to be reported only when consecutive read information at the predetermined interval is obtained. As a result, the wireless tag communication device can report the position of the target tag with high accuracy that is obtained based on the consecutive read information at the predetermined interval.

In the embodiments described above, a case where a program executed by the processor is stored in advance in the memory of the device is described. However, the program executed by the processor may be downloaded from a network to the device or may be installed from a storage medium to the device. The storage medium may be any storage medium such as a CD-ROM that can store a program and can be read by the device. Functions obtained by installation or download in advance may be implemented in cooperation with an operating system (OS) or the like in the device.

Each function of the embodiments described above can be realized by one or more processing circuits. Here, the term "processing circuit" as used herein includes a processor programmed to execute each function by software, such as a processor implemented by an electronic circuit, or a device such as an ASIC (Application Specific Integrated Circuit), a DSP (Digital Signal Processor), a FPGA (Field Programmable Gate Array), and conventional circuit modules.

While certain embodiments have been described, these embodiments have been presented by way of example only, and are not intended to limit the scope of the disclosure. These novel embodiments can be implemented in various other forms, and various omissions, substitutions, and modifications can be made without departing from the gist of the disclosure. The embodiments and the modifications thereof are included in the scope and the spirit of the disclosure, and are included in a scope of the invention disclosed in the claims and equivalents thereof.

What is claimed is:

1. A wireless tag communication device, comprising:

a communication device configured to communicate with a wireless tag that is a target;

a position detection sensor configured to detect information indicating a self position of the wireless tag communication device;

a memory configured to store the self position, which is specified based on detection information from the position detection sensor, in association with a reading result obtained by the communication device reading the wireless tag; and a processor configured to estimate a position of the wireless tag when three or more consecutive reading results of the wireless tag at a predetermined interval are obtained, the three or more consecutive reading results of the wireless tag being stored in the memory.

2. The wireless tag communication device according to claim 1, further comprising:

a display configured to display information, wherein the processor displays, on the display, information indicating the position of the wireless tag that is estimated when the three or more consecutive reading results of the wireless tag at the predetermined interval are obtained.

3. The wireless tag communication device according to claim 1, wherein the processor estimates the position of the wireless tag when the three or more consecutive reading results of the wireless tag at a predetermined cycle serving as the predetermined interval are obtained.

4. The wireless tag communication device according to claim 1, wherein the processor estimates the position of the wireless tag when the three or more consecutive reading results of the wireless tag at a predetermined distance with a change amount of the self position, which is specified based on the detection information from the position detection sensor, as the predetermined interval are obtained.

5. The wireless tag communication device according to claim 1, wherein the processor further complements the reading results of the wireless tag based on the self position, which is specified based on the detection information from the position detection sensor, and the estimated position of the wireless tag if the reading results of the wireless tag at the predetermined interval are not acquirable.

6. The wireless tag communication device according to claim 1, further comprising an antenna.

7. The wireless tag communication device according to claim 6, wherein the communication device repeatedly reads the wireless tag in a reading area set by an orientation of the antenna and a magnitude of a radio wave output from the antenna while estimating the position.

8. A wireless tag communication method, comprising:

acquiring a reading result of a wireless tag that is a target;

acquiring position information indicating a position;

storing the reading result obtained by reading the wireless tag in association with the position information; and estimating a position of the wireless tag when three or more consecutive reading results of the wireless tag at a predetermined interval are obtained.

9. The wireless tag communication method according to claim 8, further comprising:

displaying information indicating the position of the wireless tag that is estimated when the three or more consecutive reading results of the wireless tag at the predetermined interval are obtained.

10. The wireless tag communication method according to claim 8, further comprising:

estimating the position of the wireless tag when the three or more consecutive reading results of the wireless tag at a predetermined cycle serving as the predetermined interval are obtained.

11. The wireless tag communication method according to claim 8, further comprising:

estimating the position of the wireless tag when the three or more consecutive reading results of the wireless tag at a predetermined distance with a change amount of the self position, which is specified based on the detection information, as the predetermined interval are obtained.

12. The wireless tag communication method according to claim 8, further comprising:

complementing the reading results of the wireless tag based on the self position, which is specified based on the detection information, and the estimated position of the wireless tag if the reading results of the wireless tag at the predetermined interval are not acquirable.

13. The wireless tag communication method according to claim 8, further comprising:

repeatedly reading the wireless tag in a reading area set by an orientation of an antenna and a magnitude of a radio wave output from the antenna while estimating the position.

14. A hand-held portable wireless tag communication device, comprising:

a gripable handle;

a communication device configured to communicate with a wireless tag that is a target;

a position detection sensor configured to detect information indicating a self position of the wireless tag communication device;

a memory configured to store the self position, which is specified based on detection information from the position detection sensor, in association with a reading result obtained by the communication device reading the wireless tag; and a processor configured to estimate a position of the wireless tag when three or more consecutive reading results of the wireless tag at a predetermined interval are obtained, the three or more consecutive reading results of the wireless tag being stored in the memory.

15. The hand-held portable wireless tag communication device according to claim 14, further comprising:

a display configured to display information, wherein the processor displays, on the display, information indicating the position of the wireless tag that is estimated when the three or more consecutive reading results of the wireless tag at the predetermined interval are obtained.

16. The hand-held portable wireless tag communication device according to claim 14, wherein the processor estimates the position of the wireless tag when the three or more consecutive reading results of the wireless tag at a predetermined cycle serving as the predetermined interval are obtained.

17. The hand-held portable wireless tag communication device according to claim 14, wherein the processor estimates the position of the wireless tag when the three or more consecutive reading results of the wireless tag at a predetermined distance with a change amount of the self position, which is specified based on the detection information from the position detection sensor, as the predetermined interval are obtained.

18. The hand-held portable wireless tag communication device according to claim 14, wherein the processor further complements the reading results of the wireless tag based on the self position, which is specified based on the detection information from the position detection sensor, and the estimated position of the wireless tag if the reading results of the wireless tag at the predetermined interval are not acquirable.

19. The hand-held portable wireless tag communication device according to claim 14, further comprising an antenna.

20. The hand-held portable wireless tag communication device according to claim 19, wherein the communication device repeatedly reads the wireless tag in a reading area set by an orientation of the antenna and a magnitude of a radio wave output from the antenna while estimating the position.

* * * * *